United States Patent [19]

Azuma et al.

[11] 4,023,326

[45] May 17, 1977

[54] SASH HAVING RAIL WITH ADJUSTING DEVICE

[75] Inventors: Akira Azuma, Uozu; Kiyohide Hirano, Toyama, both of Japan

[73] Assignee: Yoshida Kogyo K.K., Tokyo, Japan

[22] Filed: Mar. 12, 1976

[21] Appl. No.: 666,202

[30] Foreign Application Priority Data

Mar. 19, 1975 Japan ............................. 50-37737

[52] U.S. Cl. ........................... 52/217; 312/257 SK; 312/140; 49/501; 160/372; 52/624

[51] Int. Cl.² ........................................... F16B 7/04

[58] Field of Search ............. 52/758 C, 758 H, 656, 52/217, 760, 624, 625, 626, 627; 49/501, 504; 160/372, 374, 381; 248/251, 271, 298; 312/140, 257 SK

[56] References Cited

UNITED STATES PATENTS

| | | | |
|---|---|---|---|
| 3,571,995 | 3/1971 | Kasprzak | 52/217 X |
| 3,747,898 | 7/1973 | Warren | 248/251 X |

*Primary Examiner*—Wayne L. Shedd

*Attorney, Agent, or Firm*—Hill, Gross, Simpson, Van Santen, Steadman, Chiara & Simpson

[57] ABSTRACT

A sash or a door has a vertically adjustable top rail by which the vertical size of the door or window is adjusted to suit the opening in a window frame or door frame, there being an adjusting device by which the top rail is selectably positioned. The adjusting device includes a supporting member for being secured to a vertical surface beneath the top rail, a wing projecting horizontally therefrom and disposed at one side of the supporting member, and an adjusting screw carried by the horizontal wing and engageable with the top rail from below.

4 Claims, 3 Drawing Figures

SASH HAVING RAIL WITH ADJUSTING DEVICE

BACKGROUND OF THE INVENTION

1. Field of the Invention

This invention relates to adjusting devices forming a part of telescopically adjustable top rails of window sashes, panel sashes, doors or other building components.

2. Prior Art

By "adjusting device" is meant a device for adjusting the height of the window sash or the like to be complemental to that of the opening in its window frame. In order to facilitate the installation of the window sashes, panel sash or the like into their respective window frames, it is desirable that the height of the sashes be slightly adjustable after being mounted within the respective window frames. The sash may first be mounted into its window frame with the top rail of the sash in its lowered state. After the mounting of the sash into its frame, the top rail is elevated to mate with the header of the window frame to provide effective and smooth opening and closing operation of the sash and to avoid the occurence of any accidental misfit between the sash and the window frame. For this purpose, an adjustable top rail has been proposed previously.

The prior adjustable top rail generally has two L-shaped corner key blocks made of solid plastic, wood or other suitable material, each key block being securely attached at both ends of the top rail. The L-shaped corner key block has a downwardly extending leg which is frictionally received into a channel provided in a vertical stile of the sash to assist in securing the stile and the top rail together as well as to permit the top rail to telescopically elevate in a vertical direction. In order to adjust and maintain the top rail in its desired height, an adjusting device for regulating the height is needed.

A prior art adjusting device for use with such an adjustable top rail generally comprises a substantially flat right angular member having two legs and an adjusting screw provided on one of its legs. The adjusting device of this configuration is secured onto a panel member of the sash in the vicinity of an upper corner defined by the top rail and one of the stiles of the sash in an inverted L-shaped fashion when seen from the transverse direction so that the leg bearing the adjusting screw lies horizontally and immediately beneath the top rail of the sash. The adjusting device of this configuration has imposed a limitation upon the projecting length of the adjusting screw which projects upwardly from the leg. As the leg and the top rail are so closely positioned with respect to each other, the projecting length of the adjusting screw is rendered extremely short, i.e. the adjusting screw is held by the leg only at its endmost portion. The adjusting screw is therefore prone to be easily detached from its screw hole provided on the leg when loosened slightly as a result of vibration or shock such as caused by the opening and closing of the sash. The adjusting device of such configuration furthermore has a drawback in that a screw driver or any other similar tool for attaching the device onto the panel or sash, frequently abuts against the adjusting screw during the installation of a mounting screw. In order to avoid this, the assembler or the worker must first detach the adjusting screw from the horizontally projecting leg before the device can be attached onto the panel member with a mounting screw or any other fastening means. This operation is time consuming and tedious on the part of the assembler, especially where there is a little space.

SUMMARY OF THE INVENTION

With the above-mentioned prior art shortcomings in view, it is an object of the invention to provide an improved adjusting device which permits easy installation onto a sash having an adjustable top rail.

Another object of the invention is to provide an adjusting device wherein the adjusting screw is maintained in its proper position, even under severe opening and closing operation of the sash.

According to the invention, sash has an adjustable top rail and an adjusting device which device includes a supporting member and an adjusting screw screwed into a screw hole provided on a wing member. The wing bearing the adjusting screw is positioned sidewise of the supporting member and is formed by horizontally bending a portion of the support member at substantially right angles to the member. The adjusting device is secured onto a panel member in the vicinity of the upper corner of the sash.

Other advantages, features and additional objects of the present invention will become manifest to those versed in the art upon making reference to the detailed description and the accompanying sheets of drawings in which a preferred structural embodiment incorporating the principles of the present invention is shown by way of illustrative example.

DESCRIPTION OF THE PREFERRED EMBODIMENT

Figure 1:
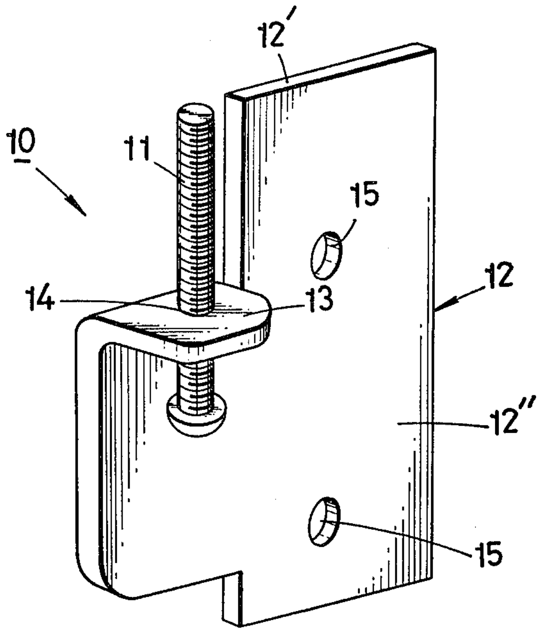
FIG. 1 is an enlarged perspective view of an adjusting device according to the invention.

FIG. 1 illustrates in detail an adjusting device 10 according to the invention which includes an adjusting screw 11 and a supporting member 12 made of a suitable flat metal sheet. A portion of the supporting member 12 is horizontally bent at substantially a right angle to the main portion 12″ of the member 12 to form a horizontally projecting wing 13. The wing 13 lies far beneath the upper edge 12′ of the supporting member 12. A screw hole 14 in the wing 13 receives the adjusting screw 11 having a length greater than the distance between the upper surface of the wing 13 and the upper edge 12′ of the support member 12. The main portion 12″ of the supporting member 12 has a plurality of apertures 15 for receiving a plurality of mounting screws 16 for securing the device 10 onto a panel member 17.

Figure 2:
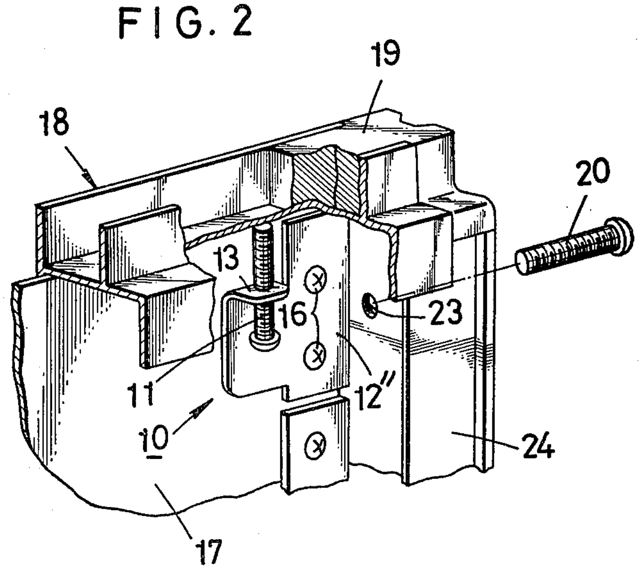
FIG. 2 is a perspective view of a panel sash having an adjustable top rail together with the device shown in FIG. 1.
Figure 3:
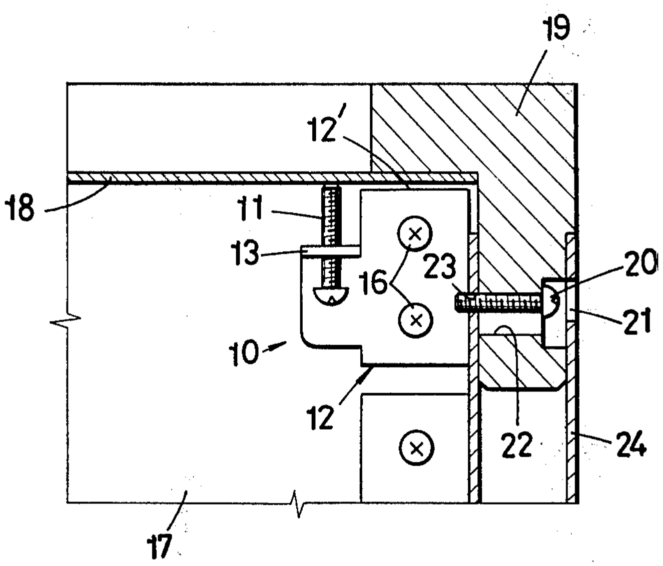
FIG. 3 is a vertical cross-sectional view of the panel sash provided with the adjusting device and the adjustable top rail.

As best shown in FIGS. 2 and 3, the adjusting device 10 of the sash is first attached onto the panel 17 by the mounting screws 16 beneath a corner key block 19 attached at one end of an adjustable top rail 18. The corner key block 19 is made of metal, solid plastic, wood or any other suitable material. After the attachment of the adjusting device 10 onto the panel 17, the adjusting screw 11 is screwed upwardly so that the flat end of the screw abuts against the lower surface of the top rail 18 and pushes the entire top rail together with the corner key block upwardly until the top rail mates with a header (not shown) of the window frame, door frame, or the like.

As best shown in FIG. 3, a locking screw 20 is inserted through 2 hole 21 of a stile 24, through an oblong hole 22 in the corner key block 19 and is tightly screwed into a screw hole 23 in the inner surface of the stile 24 in order to avoid accidental detachment of the adjustable top rail 18 from the stile 24.

As the apertures 15 are disposed at one side of the wing 13 carrying the adjusting screw 11, the attachment of the device 10 is greatly facilitated, because the necessity of removing the adjusting screw 11 from the screw hole 14 to enable attachment or mounting is eliminated. Furthermore, when the device of this construction is to be installed and adjusted, in that the wing 13 carrying the adjusting screw is relatively remote from both the vertical stile 24 and the panel 17, installation and adjustment is rendered easy. Due to the wing's being positioned far beneath the upper edge 12′ of the supporting member 12, the adjusting screw 11 can be screwed in from the lower surface of the wing a substantial distance toward the top rail 18. Thus an accidental detachment of the adjusting screw from the screw hole 14 is avoided.

The embodiment of the device according to the invention shown in the drawings can be termed "right-handed" and is the one adapted to fit on the upper right hand corner of the sash as viewed from the interior of a building. A left-handed adjusting device, constructed as a reverse image, is attached on the upper left corner (not shown) of the sash. Thus the adjusting device which is secured to the left corner of the sash is similar to the one shown in FIG. 1 except that the wing bearing the adjusting screw is positioned at the right hand side of the main portion of the supporting member.

Although various minor modifications might be suggested by those versed in the art, it should be understood that we wish to embody within the scope of the patent warranted hereon, all such embodiments as reasonably and properly come within the scope of our contribution to the art.

We claim as our invention:

1. In a sash having a vertically adjustable horizontal top rail, the improvement of an adjusting device, said adjusting device comprising, in combination therewith;

a. a supporting member fixedly secured to a vertical surface of the sash and disposed beneath said top rail;

b. a wing projecting horizontally from one side of said supporting member in fixed relation to said vertical surface, said wing being disposed at a height lower than the upper edge of said supporting member and having a screw hole with a vertical axis; and c. a vertical adjusting screw disposed in said screw hole in engagement with a downwardly facing portion of said top rail.

2. A device according to claim 1 wherein said supporting member lies in a vertical plane, said wing being an integral portion of said supporting member bent into a horizontal plane.

3. A device according to claim 1 wherein said adjusting screw has a length greater than the distance between the upper surface of said wing and the uppermost edge of said supporting member.

4. A device according to claim 1 wherein said supporting member has a plurality of vertically spaced holes confronting said vertical surface, and a plurality of mounting screws extending through said spaced holes and said vertical surface into the sash.

* * * * *